(12) United States Patent
Beard et al.

(10) Patent No.: US 10,620,954 B2
(45) Date of Patent: Apr. 14, 2020

(54) DYNAMIC ACCELERATION OF DATA PROCESSOR OPERATIONS USING DATA-FLOW ANALYSIS

(71) Applicant: Arm Limited, Cambridge (GB)

(72) Inventors: Jonathan Curtis Beard, Austin, TX (US); Curtis Glenn Dunham, Austin, TX (US); Alejandro Rico Carro, Austin, TX (US)

(73) Assignee: Arm Limited, Cambridge (GB)

( * ) Notice: Subject to any disclaimer, the term of this patent is extended or adjusted under 35 U.S.C. 154(b) by 50 days.

(21) Appl. No.: 15/939,637

(22) Filed: Mar. 29, 2018

(65) Prior Publication Data

US 2019/0303143 A1   Oct. 3, 2019

(51) Int. Cl.
| | | |
|---|---|---|
| *G06F 9/30* | (2018.01) | |
| *G06F 15/76* | (2006.01) | |
| *G06F 5/06* | (2006.01) | |
| *G06N 3/00* | (2006.01) | |
| *G06F 15/80* | (2006.01) | |
| *G06N 3/04* | (2006.01) | |

(Continued)

(52) U.S. Cl.
CPC ........ *G06F 9/3005* (2013.01); *G06F 9/30036* (2013.01); *G06F 9/30098* (2013.01); *G06F 15/8076* (2013.01); *G06F 5/06* (2013.01); *G06F 9/3009* (2013.01); *G06F 9/384* (2013.01); *G06F 9/3824* (2013.01); *G06F 2205/067* (2013.01); *G06F 2212/301* (2013.01); *G06N 3/04* (2013.01); *G06N 3/08* (2013.01)

(58) Field of Classification Search
CPC .............. G06F 9/3005; G06F 9/30036; G06F 9/30098; G06F 9/3836; G06F 9/3838; G06F 9/384; G06F 9/3855; G06F 9/3007; G06F 9/30105; G06F 9/3824; G06F 5/06; G06F 5/065; G06F 2205/067; G06F 15/8053; G06F 15/8076; G06F 2212/301; G06F 15/82; G06F 15/825; G06F 9/3009; G06N 3/04; G06N 3/0454; G06N 3/063; G06N 3/08; G06N 3/10
USPC ...... 712/1–9, 201, 222, 225, 18, 25; 706/16, 706/28, 41–44
See application file for complete search history.

(56) References Cited

U.S. PATENT DOCUMENTS

| | | | |
|---|---|---|---|
| 5,644,752 A | 7/1997 | Cohen et al. | |
| 8,505,013 B2 * | 8/2013 | Pollock | G06F 9/32 711/5 |
| 8,909,872 B1 | 12/2014 | Schlansker et al. | |

(Continued)

*Primary Examiner* — Daniel H Pan
(74) *Attorney, Agent, or Firm* — Leveque IP Law, P.C.

(57) ABSTRACT

A method and apparatus are provided for dynamically determining when an operation, specified by one or more instructions in a data processing system, is suitable for accelerated execution. Data indicators are maintained, for data registers of the system, that indicate when data-flow from a register derives from a restricted source. In addition, instruction predicates are provided for instructions to indicate which instructions are capable of accelerated execution. From the data indicators and the instruction predicates, the microarchitecture of the data processing system determines, dynamically, when the operation is a thread-restricted function and suitable for accelerated execution in a hardware accelerator. The thread-restricted function may be executed on a hardware processor, such as a vector, neuromorphic or other processor.

22 Claims, 6 Drawing Sheets

(51) Int. Cl.
*G06F 9/38* (2018.01)
*G06N 3/08* (2006.01)

(56) References Cited

U.S. PATENT DOCUMENTS

| | | |
|---|---|---|
| 2005/0152435 A1 | 7/2005 | Lesartre et al. |
| 2006/0236011 A1 | 10/2006 | Narad et al. |
| 2006/0259734 A1 | 11/2006 | Sheu et al. |
| 2012/0117223 A1 | 5/2012 | Jennings et al. |
| 2012/0191949 A1* | 7/2012 | Gonion ............... G06F 9/30036 712/208 |
| 2013/0326201 A1* | 12/2013 | Gopal ................. G06F 9/30043 712/225 |
| 2014/0208031 A1 | 7/2014 | Raikin et al. |
| 2015/0242210 A1* | 8/2015 | Kim .................... G06F 9/30189 712/7 |
| 2015/0293785 A1* | 10/2015 | Murphy ............... G06F 9/5027 718/102 |
| 2017/0200094 A1* | 7/2017 | Bruestle ................ G06N 20/00 |
| 2018/0293169 A1 | 10/2018 | Beard et al. |

* cited by examiner

DYNAMIC ACCELERATION OF DATA PROCESSOR OPERATIONS USING DATA-FLOW ANALYSIS

BACKGROUND

In data processing, it is common to perform operations on one-dimensional arrays of data called vectors. The micro-architecture of a data processor can be designed to take advantage of such operations. For example, when processing data vectors, a single instruction may be used multiple times, but the instruction only needs to be fetched and decoded once. Further the data may be at uniformly spaced locations, so register re-naming and address translation does not need to performed multiple times.

Data processors optimized for operating on data vectors may be called vector processors or array processors. A vector processor implements an instruction set containing instructions that explicitly operate on data vectors (usually multiple data elements), whereas general purpose data processors implement scalar instructions that operate on single data items. For example, some data processors implement SIMD (Single Instruction, Multiple Data) instructions to provide a form of vector processing on multiple (vectorized) data sets.

A disadvantage of using a special instruction set for vector operations is that a programmer or compiler must know in advance (or statically) when vector operations are to be performed and the amount of data to be processed. This is not always possible, since the number of data elements to be processed may itself depend on the input data.

Data processing systems commonly execute a number of threads. The execution threads may be performed serially on single serial processor using time-slicing, in parallel on a number of linked processing cores, or a combination thereof. In many applications, there is a desire to receive data from multiple data threads, perform operations on the data and pass the processed data to other execution threads. When multiple cores are used, the potential advantages of vector processing may not be achieved because of the resources needed to pass data between threads. For example, in the absence of dedicated hardware, a core-to-core transfer may take about 630 cycles using a software first-in, first-out (FIFO) buffer. Data transfer between sockets may take about 1500 cycles. In addition, cache misses may occur on both producer and consumer cores.

There exists a need for a data processor that can perform efficient vector processing in a multi-thread execution environment. Current approaches for auto-vectorization require that the data-flow bounds be determined statically. For example, it may be required that the loop bounds be known at compilation time, rather than determined dynamically during execution.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
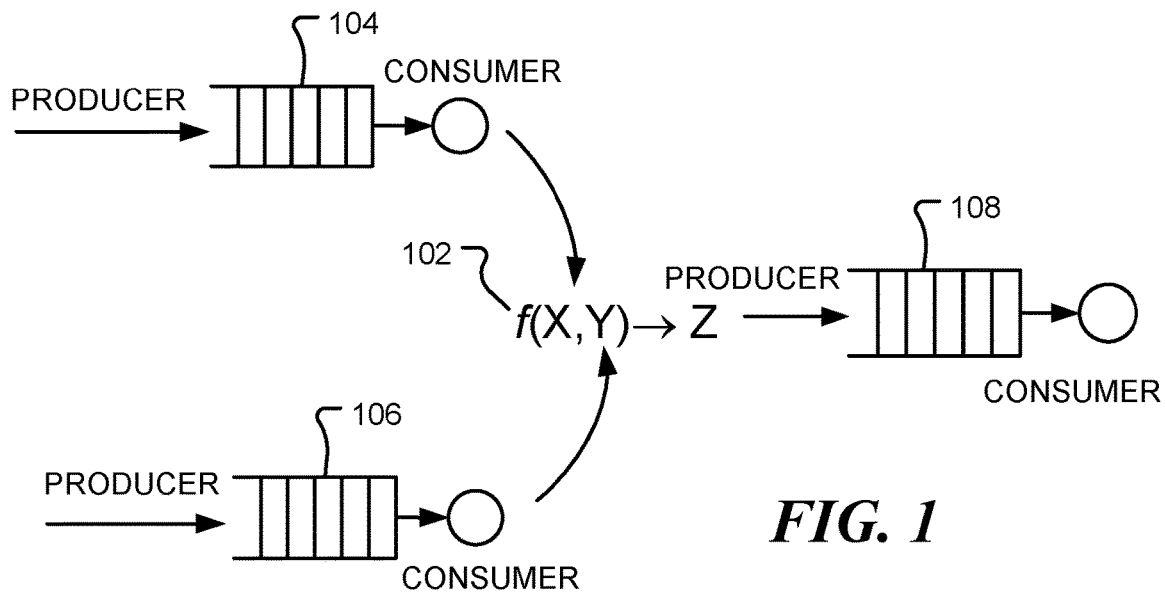
FIG. 1 is a diagrammatic representation of data processing using queues in a data processing system, in accordance with various representative embodiments.

The various apparatus and devices described herein provide extensions to the microarchitecture of a data processor for improved processing of vector data.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In data processing, it is common to perform operations on one-dimensional arrays of data called vectors. The micro-architecture of a data processor can be designed to take advantage of such operations. For example, when processing vectors, a single instruction may be used multiple times, but the instruction only needs to be fetched and decoded once. Further, the data may be stored at uniformly spaced locations, so register re-naming and address translation does not need to performed multiple times.

Data processors optimized for operating on data vectors may be called vector processors or array processors, for example. A vector processor implements an instruction set containing instructions that explicitly operate on data vectors, whereas general purpose data processors implement scalar instructions that operate on individual data elements. For example, some data processors implement SIMD (Single Instruction, Multiple Data) instructions to provide a form of vector processing on multiple (vectorized) data sets. Other general-purpose cores provide means to mix scalar and vector code, providing both explicit vector operations and scalar operations, however, the mode must be known at compile time.

A disadvantage of using a special instruction set for vector operations is that a programmer or compiler must know in advance when vector operations are to be performed and the amount of data to be processed. This is not always possible, since the number of data elements to be processed may itself depend on the input data.

Data processing systems commonly execute a number of threads. These execution threads may be performed serially on a single serial processor using time-slicing, in parallel on a number of linked processing cores, or a combination thereof. In many applications, there is a desire to pass data from one execution thread to another via a data channel. Moreover, the data may be passed in a specified pattern. For example, a first-in, first-out (FIFO) communication pattern is inherent in many applications, where data is entered sequentially into a storage medium and is removed from the storage medium in the same sequential order. Thus, the first data stored in the medium will be the first data taken out. A FIFO may be implemented explicitly as a buffer in hardware or it may be implemented in software. In other applications, the order of the data is not important, but the data is still generated by a producer and directed towards a consumer. There exists a need for a data processor that can perform vector processing in a multi-thread execution environment.

It is known that processes and threads executing in a data processing system may share information through use of common storage, either a physical storage medium or a virtual address space. However, in this kind of communication, information is not directed from one process or thread to another. Directed communication may be achieved using software in conjunction with a shared memory, but transmission of data from one thread to another consumes valuable processor resources (e.g., through locks, false sharing, etc.). These events conspire to increase latency, increase energy usage, and decrease overall performance. Similarly, transmission of data from one processing core to another requires communication through multiple layers of cache hierarchy.

U.S. patent application Ser. No. 15/483,036, filed Apr. 10, 2017, entitled 'CACHE-BASED COMMUNICATION BETWEEN EXECUTION THREADS OF A DATA PROCESSING SYSTEM', which is hereby incorporated by reference herein in its entirety, describes a virtual FIFO implemented using caches.

Data channels for vector data may be implemented by other means, including dedicated hardware, software, or a combination thereof, without departing from the present disclosure.

More generally, an operation to be performed in a data processing system is specified by one or more instructions. Some operations can be represented as isolated computations on data-flows, where the operation has one or more input data-flows and one or more output data-flows. A data-flow may be derived from a FIFO, as discussed above, or from another data source such as a memory block, an input device or streaming data port for example. When all of the input data-flows associated with an operation are restricted, such that the data is to be consumed by a single execution thread, and all of output data-flows are generated by the same thread, the operation has a potential for accelerated execution. For example, the operation could be performed on a hardware accelerator such as a vector processor, an array processor, or a neuromorphic processor. In a neuromorphic processor, for example, the inputs and outputs of a bounded data-flow region can be used to train a neural net to implement the function performed in the data-flow.

In accordance with an aspect of the disclosure, a micro-architecture of a data processing system is configured to identify automatically when an operation specified by a set of instructions is able to be performed using accelerated execution.

In accordance with an embodiment of the disclosure, data indicators are maintained for data registers to indicate when data-flow from a register derives from a restricted source, that is, when the data-flow is to be consumed by a single thread. Instruction predicates are provided for instructions to indicate which instructions of an instruction set are capable of accelerated execution. The data indicators and the instruction predicates are used by the micro-architecture of the data processing system to determine when an operation is a thread-restricted function. Operations identified as thread-restricted functions may be processed differently from other operations. For example, a thread-restricted function may be executed in a hardware accelerator.

A restricted source may be a data buffer or queue, such as a FIFO, that restricts output to a single execution thread. An explicit instruction in an instruction set architecture of the data processing system may be used to indicate retrieving data from a restricted source.

In one embodiment, where the hardware accelerator is a vector processor, accelerated execution is achieved by generating vector micro-operations for the vector processor when the operation is a thread-restricted function. The micro-architecture may be configured to determine an amount of data available at a restricted source, such as a FIFO buffer, and to generate a vector micro-operation dependent upon the amount of data available.

In some embodiments, execution of an operation is accelerated using a vector processor. In other embodiments, scalar and vector processing is provided in a single processor and execution of an operation is accelerated by selecting which micro-operation instructions are issued to the hardware. For example, the Scalable Vector Extension (SVE) architecture of Arm Limited provides a vector extension execution mode that enables both scalar and vectors instructions.

An operation may be identified as being capable of acceleration when the (a) instructions themselves are predicated to be capable of being accelerated, and (b) all of the associated data-flows are restricted to a single thread. In an embodiment of the disclosure, the data-flow specified by a set of instructions is tracked using a status vector. This will be described in more detail below. As instructions are processed, the status vector is updated to indicate opening of data-flows from restricted sources. For each arithmetic instruction the status vector is updated to indicate closure of data-flows associated with input operands of the arithmetic instruction and to indicate opening of a data-flow associated with an output operand of the arithmetic instruction. In addition, the status vector is updated to indicate closing of data-flows to restricted data sinks. A complete thread-restricted function is identified when the status vector indicates all data-flows to be closed, provided all of the instructions encountered are capable of accelerated operation. For example, an operation is not a thread-restricted function when an instruction predicate for an instruction indicates that the instruction is not capable of accelerated execution or when an operand of an instruction does not derive from a thread-restricted source.

The description below describes acceleration using a vector processor. However, the disclosure is not limited to this example. Other hardware accelerators may be used. The hardware accelerator may be located on the same chip as a scalar processor or on a different chip. Alternatively, a single processor may be used that is capable of executing both scalar and vector (non-accelerated and accelerated) micro-operations. In one embodiment, a neuromorphic accelerator is used. In a neuromorphic accelerator, some of the input and output data derived from execution of the thread-restricted function are used to train a neuromorphic processor, while output outputs are computed by the trained neuromorphic processor. Other types of hardware accelerators will be apparent to those of skill in the art.

An example embodiment of the present disclosure relates to a data-flow extension to the microarchitecture of a data processing system. The extension enables dynamic acceleration (such as dynamic vectorization) for any N-in and one-out block of code for which the inputs and outputs are defined within a given instruction window. For example, the function $f(X){\rightarrow}Y$, has an input vector X and a single output Y, while the function $f(X,Y){\rightarrow}Z$ has input vectors X and Y and a single output Z. The extension to the microarchitecture enables the microarchitecture to determine automatically, and dynamically, whether the code specifies a function that could be computed using accelerated execution. For example, the microarchitecture determines whether the function is computed as a scalar function or "vectorized" and computed using vector operations for improved performance. The determination is performed without the compiler or programmer needing to insert explicit vector instructions into the code. In one embodiment, the input vectors may be provided by virtual link FIFO instructions. The output may be a scalar or a vector that is passed to virtual link FIFO instructions.

FIG. 1 is a diagrammatic representation of data processing using queues in a data processing system, in accordance with various representative embodiments. The function $f(X,Y){\rightarrow}Z$ (102) has input vector X received from data queue 104 and second input Y received from data queue 106. The resulting output vector Z is stored into queue 108. Thus, the function $f(X,Y){\rightarrow}Z$ (102) consumes data from queues 104 and 106 and produces data for queue 108.

By way of example, the following instruction sequence is considered.

LISTING 1

```
loop:
POP_QR    [r1] r2
B.EQ      pop_failed_1
POP_QR    [r3] r4
B.EQ      pop_failed_2
ADD       r5  r2  r4
MUL       r6  r5  r2
PUSH_QR   [r7] r6
B         loop
...
pop_failed_1:
...
pop_failed_2:
...
```

In this example two new queue instructions are introduced.

Figure 2:
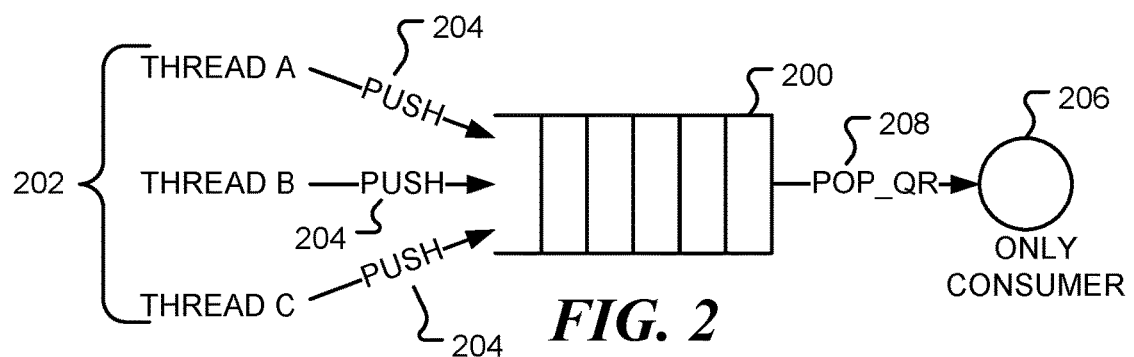
FIG. 2 is a diagrammatic representation of a restricted output queue of a data processing system, in accordance with various representative embodiments.

The instruction "POP_QR" is an instruction to retrieve a data value from a queue and includes a designation that the queue is 'restricted' in the sense that data from the queue is to be used by a single consumer thread. That is, there is only exit from the queue (there could be many inputs). FIG. 2 is a diagrammatic representation of a restricted source of a data processing system, in accordance with various representative embodiments. In this embodiment, the restriction source is a queue 200, such as a first-in, first-out (FIFO) buffer, receives data from any number of execution threads 202 (threads A, B and C in the example shown). The data is pushed into queue 200 by PUSH instructions 204 and is retrieved from queue 200 by a single consumer 206 using a restricted POP_QR instruction 208. Thus, the source is 'restricted' in the sense that it is restricted to a single consumer.

The POP_QR instruction has no prerequisites in that it places no additional restrictions upon its source operand (the virtual FIFO for example). All FIFOs are vectorizable in a similar manner to data stored in blocks.

Figure 3:
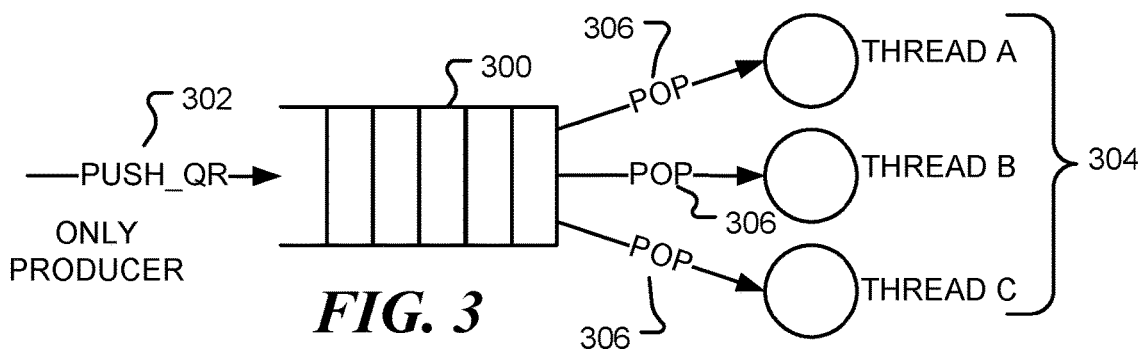
FIG. 3 is a diagrammatic representation of a restricted input queue of a data processing system, in accordance with various representative embodiments.

The instruction "PUSH_QR" is an instruction to store a data value into a queue and includes a designation that the queue is restricted in the sense that data is pushed into the queue by a single producer thread only. That is, there is only one entrance to the queue. FIG. 3 is a diagrammatic representation of a restricted input queue of a data processing system, in accordance with various representative embodiments. Queue 300, such as a first-in, first-out (FIFO) buffer, receives data from a single producer. The data pushed into queue 300 by restriction PUSH_QR instruction 302 and may be retrieved from queue 300 by any number of consumers 304 using unrestricted POP instructions 306. Consumption by consumer threads A, B and C is shown in the example. Queue 300 is an example of a restricted data sink. The data sink is 'restricted' in the sense that it receives data from a single producer.

Queues 200 and 300, and other restricted sources and sinks, may be implemented in hardware, software, or a combination thereof. For example, lines of a data cache may be used to implement a virtual FIFO or other queue.

Figure 4:
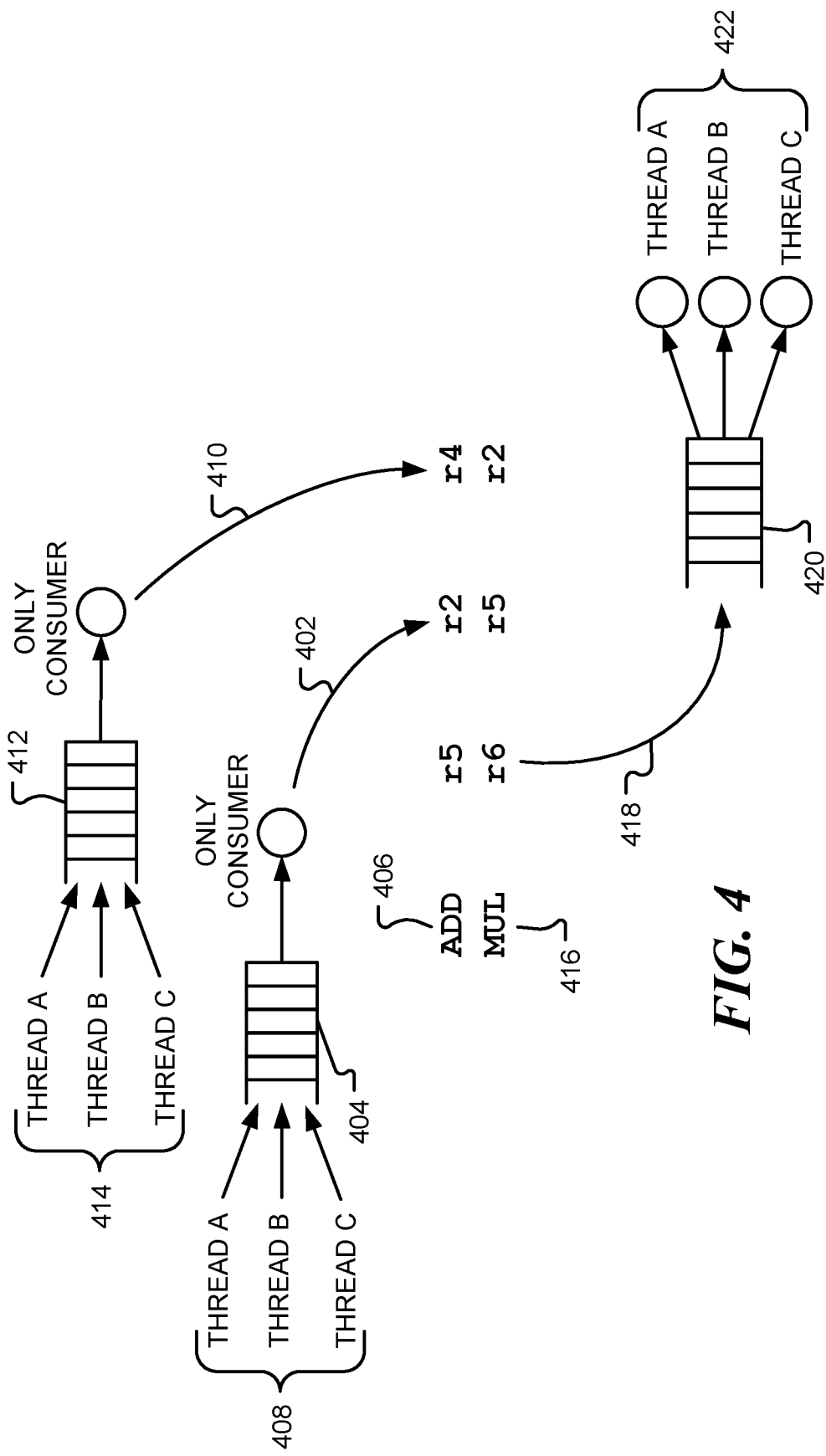
FIG. 4 is a diagrammatic representation of data processing using restricted queues in a data processing system, in accordance with various representative embodiments.

FIG. 4 is a diagrammatic representation of data processing using restricted sources and sinks in a data processing system, in accordance with various representative embodiments. The figure illustrates the execution of instructions in LISTING 1, above. Referring to FIG. 4, data 402 is retrieved from queue 404 (a restricted source) via a POP_QR instruction and placed in register r2 that provides a first operand for multiplication instruction 416. The data may have been provided by any number of execution threads 408. Similarly, data 410 is retrieved from queue 412 via a POP_QR instruction and placed in register r4 that provides a second operand for addition instruction 406. This data may have been provided by any number of execution threads 414. The result of the addition, which is stored in register r5, is multiplied by the value in r2 when instruction 416 is executed. The result of the multiplication is stored in register r6. Finally, the data 418 from register r6, is put into queue 420 (a restricted sink) by execution of the PUSH_QR instruction. The contents of queue 420 are available to any number of execution threads 422.

When the queues 404 and 412 contain multiple data elements, the section of code in bold type can be turned into vector instructions since the input operands, r2 and r4, of the addition operation (ADD) are obtained from two queue instructions (POP_QR) and the dependent output (r6) is pushed to an output queue via the instruction PUSH_QR. The number of elements available in each input queue can be checked (and potentially predicted) in order to issue a vector addition instruction for multiple elements of r2, r4 and to store the results to a vector register r5 (which is then multiplied by the contents of r2). Each element within the vector can then be pushed into the output queue at the memory address stored in [r7]. The restriction of a single output variable, while not essential, simplifies the dependency analysis.

A computer architecture may maintain an instruction window that comprises the set of instructions that can execute out of order in an out-of-order speculative processor. For example, the instruction window may consist of all instructions which are in a re-order buffer (ROB). In such a processor, any instruction within the instruction window can be executed when its operands are ready. In an embodiment of the present disclosure, analysis of data dependencies is performed using instructions and metadata maintained in the instruction window.

Figure 5:
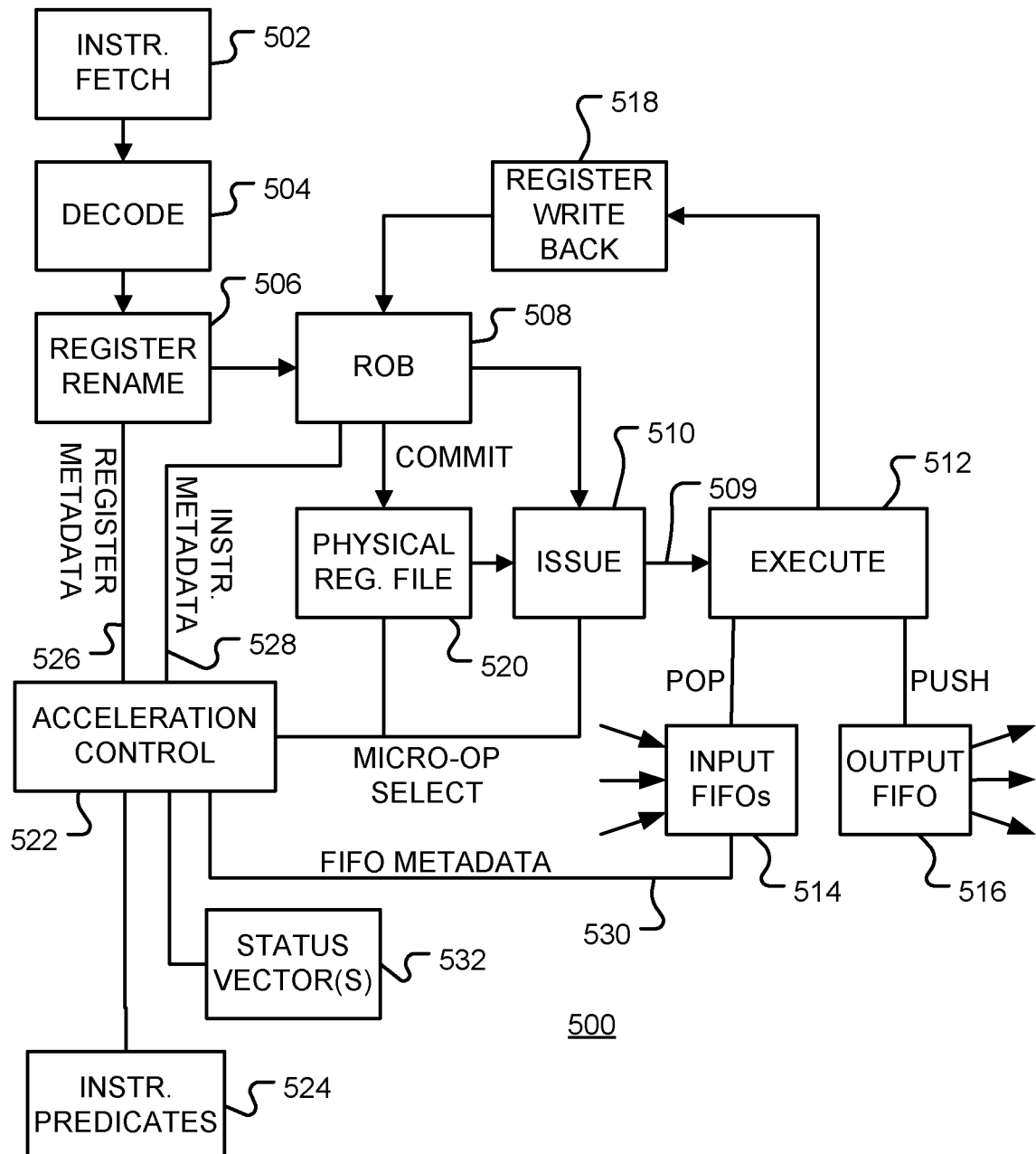
FIG. 5 is a block diagram of a system microarchitecture of a data processing system 500 in accordance with various representative embodiments.

FIG. 5 is a block diagram of a system microarchitecture 500 of a data processing system in accordance with embodiments of the disclosure. The microarchitecture 500 includes instruction fetch unit 502 operable to fetch a stream of instructions from an instruction store such as an instruction cache or memory and instruction decode unit 504. An instruction may contain references to architectural registers as operands. In rename unit 506, the architectural registers are mapped to physical registers. In accordance with an embodiment of the present disclosure, the rename unit also stores register metadata that indicates when register values are obtained from vector sources. The instructions are associated with lines in reorder buffer (ROB) 508 or other instruction queue. Reorder buffer 508 may keep track of which operands are ready and which operations have been completed. One or more micro-operations 509 corresponding to an instruction are issued in 510 and sent to execution unit 512. For example, micro-operations may be issued in order, when operands are ready, but executed in any order. POP instructions access one or more input FIFOs 514, while PUSH instructions access one or more output FIFOs 516.

Write-back unit 518 may be used to return results in output registers (such as the result of the MUL operation) back to the reorder buffer 508.

The issued micro-operations include values from physical register file 520. In accordance with the present disclosure, the physical register file 520 may include both scalar and vector registers. Alternatively, register file 520 may contain vector registers that may be used (via a mask, for example) to hold scalar or vector values.

Central to the present disclosure is an acceleration control unit 522. Acceleration control unit 522 uses information from a variety of sources to determine automatically when an instruction should be issued as an accelerated micro-operation. For example, a set of instructions and associated input data may be issued as either a set of vector micro-operations for accelerated execution or as a set of scalar micro-operations for non-accelerated execution. For acceleration in a vector processor, the information used by acceleration control unit 522 includes:

Static information as to which instructions have the potential to be vectorized is obtained from instruction predicates 524. Existing processors make use of instruction metadata to express predicates (properties of the instruction) such as "can cause exception", "can change PC", "can set condition codes", etc. The metadata may be stored or computed from the opcode, for example. The present disclosure introduces a new micro-architectural predicate that will be referred to herein as "can vectorize" or "vectorizable". In this embodiment, the "pop queue, restricted" instruction (POP_QR) and "push queue restricted (PUSH_QR) instructions introduced above would be marked with this "vectorizable" predicate.

Dynamic register metadata 526 indicating whether register data is from a vector source is obtained from rename unit 506.

Instruction metadata 528, indicating which instructions are vectorizable and have vector operands, is obtained from reorder buffer 508. FIFO metadata 530, such as data queue size, is obtained from FIFOs 514. All arithmetic operands that can be computed in a vector unit of the microarchitecture are also marked "vectorizable". For those instructions, however, the operands must already be in a vectorizable state, as discussed below.

The information is processed in vectorization control unit 522 and used to update information in a status vector 532. A status vector is associated with an instruction stream and is discussed in more detail below with reference to FIG. 7. A system may have multiple status vectors to enable automatic vectorization of multiple instruction streams.

Figure 6:
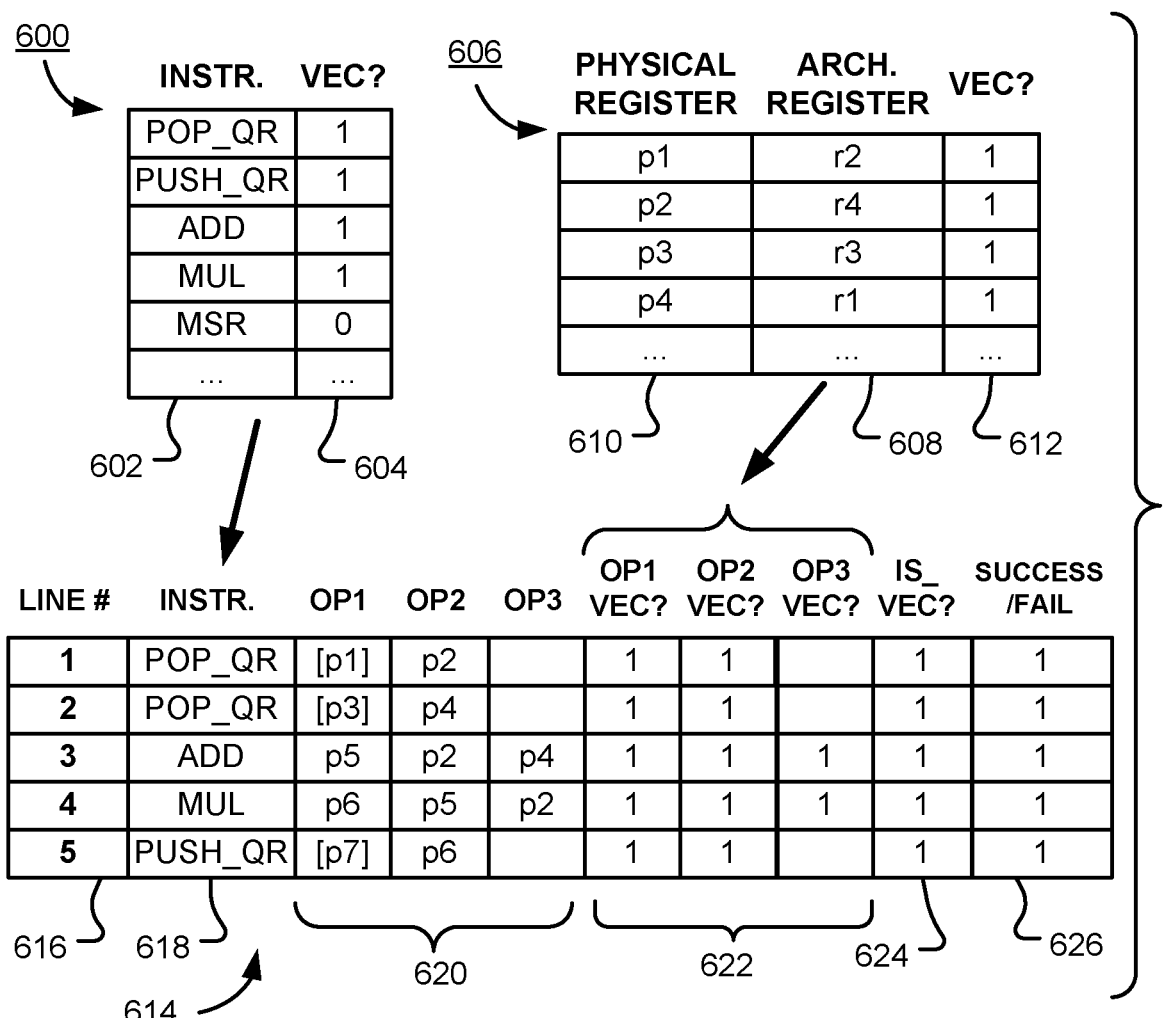
FIG. 6 shows example information tables in accordance with various representative embodiments.

FIG. 6 shows example information tables in accordance with embodiments of the disclosure. Table 600 in FIG. 6 shows some example operations in column 602 together with their associated "vectorizable" predicates (1=true, 0=false) in column 604. This predicate or property is static and may be defined in the architecture. The predicate may be indicated in the opcode of the instruction, for example.

In order to maintain metadata through the computation, the physical registers themselves will also have a "vectorizable" flag attached to them, at least notionally. This flag indicates a property of the contents of the register and could be stored in the register rename table and/or the reorder buffer (ROB). An example is shown as table 606 in FIG. 6. The table 606, which forms at least part of a register rename table, shows the architectural registers in column 608, the associated physical registers in column 610 and the "vectorizable" flags in column 612. The flags in column 612 are determined dynamically during execution (by a state machine, for example).

In the example above, properties of the operations and operands are indicated separately. However, it will apparent to those of skill in the art that alternative implementations may be used that do not need to separate these predicates and flags. Conceptually, the "vectorizable" property propagates when all of the source operands are vectorizable in addition to the operation itself. During execution, all vectorizable flags may be cleared when a non-vectorizable operation is reached (in a flash-clear operation for example).

Returning to the example code listed above, it is noted that the "POP_QR", "MUL", "ADD", and "PUSH_QR" instructions are all "vectorizable". The rename stage (for example) would tag the architectural and/or corresponding physical registers with the "vectorizable" flag, so the r2 and r3 registers would be marked as containing "vectorizable" data. Since the MUL and ADD instructions are vectorizable operations, receiving vectorizable operands (it is noted that constants are easily vectorizable), the r4 and r1 registers would also be marked as containing "vectorizable" data since they are the result of a vectorizable operation on vectorizable data. Finally, the vectorizable data in register r1 reaches the vectorizable sink operation PUSH_QR.

Table 614 in FIG. 6 shows an example of how the information from table 600 and 606 is used to determine when an operation should be performed as a vector operation. The information may be stored in a reorder buffer (ROB), for example, or some other instruction store. Column 616 indicates the instruction line number. Column 618 indicates the operation to be performed. Columns 620 indicate the operands (in lines 3 and 4, operand op3 is a destination or result register). Columns 622 indicate whether the operands are vectorizable or not. The information in these columns is derived from table 606. Column 624 indicates where the operation is to be performed as a vector operation (1) or a scalar operation (0). This information is obtained from columns 622, which provides operand information, and from table 600, which provides instruction predicates. In this example, all operations are vectorizable. Column 626 indicates whether vectorization of the instruction has been successfully vectorized or not. Success is achieved when a data path from vector input to vector output has been completed. When the data path is interrupted for any reason (for example, an input FIFO becomes empty) the entry in column 626 is set to zero.

In one embodiment, when data in an input FIFO or other input vector is exhausted, the POP_QR instruction writes to a zero flag in the processor. This indicates an "end-of-input" condition on the POP_QR instructions which can be tested with the "B. EQ" instruction. This allows the microarchitecture to handle the terminating case of the loop appropriately. When the POP_QR instruction cannot retrieve another value from the FIFO, the zero flag is set. This allows the loop to exit properly when the input data is exhausted. From a micro-architectural standpoint, this could be implemented, for example, as a predicate mask returned from the POP_QR instruction itself. The mask is then applied to all operations later in the loop. The predicate for that vector input is the logical NOT of the zero-flag corresponding to the scalar POP_QR. The predicate vector can be tested to see if it is not equal to all ones; in this case the microarchitecture can use conditional move (Mov) operations to flow forward an appropriate branch target, and conditionally branch to that indirect target if it is other than a sentinel such as zero. These operations may be performed using microcode, for example.

However, it will be apparent to those of skill in the art that the "end-of-input" may be handled in other ways without departing from the present disclosure.

The following code is an example of a micro-operations generated (after register renaming) from the instructions in LISTING 1 when the loop is dynamically vectorized:

---
LISTING 2
---
```
MOV R8, pop_failed_1
MOV R9, pop_failed_2
MOV R5, RZ          ; initialize recovery target to 'null'
loop:
POP_QR_V [R5], V2   ; vector queue pop
CSEL R5, R8, VZ     ; use 'conditional select' (CSEL) to set recovery
                      path to pop_failed_1 (R8) if any
                      queue pop resulted in 'zero'
POP_QR_V [R6], V3   ; vector queue pop
; XXX test if R5 is zero and only then CSEL the below
CSEL R5, R9, XXX    ; set recovery path to pop_failed_2 if any
                      queue pops resulted in 'zero'
ADD_V V4, V3, V2
MUL_V V1, V4, V2
PUSH_QR_V V1, [R7]
CBNZ R5, [R5]
```

In one embodiment, the predicate mask management for handling end-of-loop conditions is performed in the integer units while the vector units do the intensive computations. When the loop cannot be vectorized, the corresponding scalar micro-operations are generated.

The POP_QR_V sets the 'zero' flag when the FIFO includes less elements than those in the vector. In this case, the POP_QR_V instruction does not remove elements from the FIFO unless it can remove all elements to fill the vector capacity. The code at pop_failed_1 and pop_failed_2 executes the original scalar code to process the elements remaining in the FIFO.

It is noted that the above listing is provided by way of example only. The specific instructions generated will be depend upon the microarchitecture of the implementation.

In another embodiment, where the vectorized instructions can be predicated, the POP_QR_V instruction sets a predicate register that the MUL_V, ADD_V and PUSH_QR_V operations can read, such that computations and write operations are only performed on the elements resulting from the POP_QR_V operation. In this case, the code at pop_failed_1 and pop_failed_2 assumes there are no more elements and processes the end of the loop. Additional code may be used to check if the predicates generated by the first and second POP_QR_V instructions are the same (i.e. read the same number of elements) and to execute error handling code when an error is detected. If a particular microarchitecture does not allow a POP_QR_V implementation to write a vector register and a predicate register, the same effect could be accomplished by other means, such as the use of a special register to hold a predicate.

In one embodiment, when POP_QR_V fails to read all necessary elements to fill the vector, but there are still elements left to process, the processor may switch to scalar code. In an alternative embodiment, the processor switches to a vector instruction with a shorter vector length—less than or equal to the number of elements left in the FIFO. When there is no available vector length smaller than the number of elements left in the FIFO, the code branches to the scalar version. This approach may be used when the microarchitectures supports multiple vector lengths.

In one embodiment, a bit-vector is used to indicate vector data-flow. The length of the bit-vector is equal to or less than the number of available vector registers. This condition ensures that the number of live vector registers at any one cycle doesn't exceed the supply. In the example below, and in FIG. 7, the bit-vector is only 7 registers long, however, in a given implementation its length will correspond to the number of architected registers. For example, if there are 31 architected registers, the bit vector will store 31 register bits+1 success bit. Herein, the bit vector is referred to as a "data-flow vector".

Figure 7:
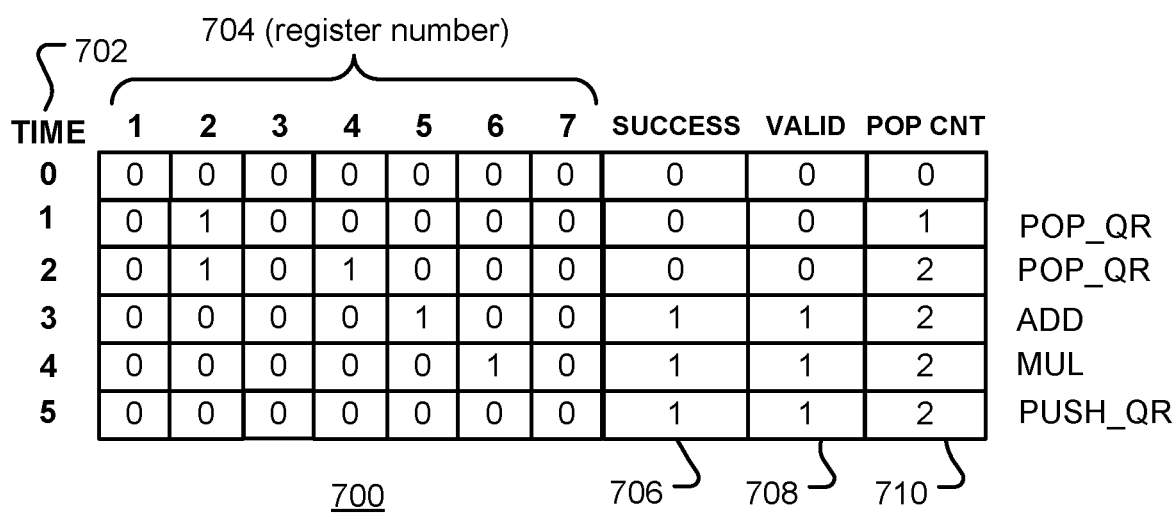
FIG. 7 is a table showing a status vector in accordance with various representative embodiments.

FIG. 7 is a table 700 showing a status vector in accordance with embodiments of the disclosure. Column 702 indicates a time or instruction counter. Columns 704-710 show the status vector at successive times. In this example, the status vector contains a 7-bit data-flow vector 704 associated with 7 registers. However, other length data-flow vectors may be used. Bit 706 indicates when vectorization has been successful, bit 708 indicates when the status vector is valid and POP_QR counter 710 is incremented for POP_QR instructions and decremented when a popped value is used in an operation. Auto-vectorization begins at the first vectorizable instruction, tracing back one level using the input operands. The auto-vectorization process begins when the input operands derive their data-flow from POP_QR instructions. As each POP_QR instruction is encountered as an incident edge from a vectorizable arithmetic instruction, a bit is set in the data-flow vector 704 to indicate which register corresponds to this POP_QR. Referring to FIG. 7, at time 1 a value is popped into register p2 and at time 2 a value is popped into register p4, so the corresponding bits in data-flow vector 704 are set to one. This indicates that the potential of a closed data-flow. However, subsequent instructions may be encountered that prevent this. The pop counter 710 is incremented at each POP_QR instruction and the status vector is marked as valid. At time 3 (which corresponds to line 3 in table 614 of FIG. 6), the first arithmetic instruction is encountered that is vectorizable with a POP_QR that doesn't yet have a status vector associate with it. First the micro-architecture checks for an open status vector. Once an open status vector is found, the bit 708 is set to one and the data-flow trace begins. This is done using the information in the data-flow vector 704. As each vectorizable instruction is encountered, the data-flow vector 704 is updated by setting the bits corresponding to inputs to zero and setting the bits corresponding to outputs to one. For example, at time 3, (which corresponds to line 3 in table 614 of FIG. 6), the bits for the input registers (p2 and p4) are set to zero and the bit for output register p5 is set to one. A 'one' bit indicates that data is flowing from that register and must be closed off so that auto-vectorization can complete. A 'zero' bit indicates that no data is flowing from the indicated register. When the PUSH_QR instruction is reached at time 4, the data-flow points are closed off (i.e., by zeroing them in the corresponding vector). If the count of non-zero elements in data-flow vector 704 is zero on a PUSH_QR, the data-flow process is closed (data flows from pop to push or source to sink successfully) the success bit 706 is set to zero.

Figure 8:
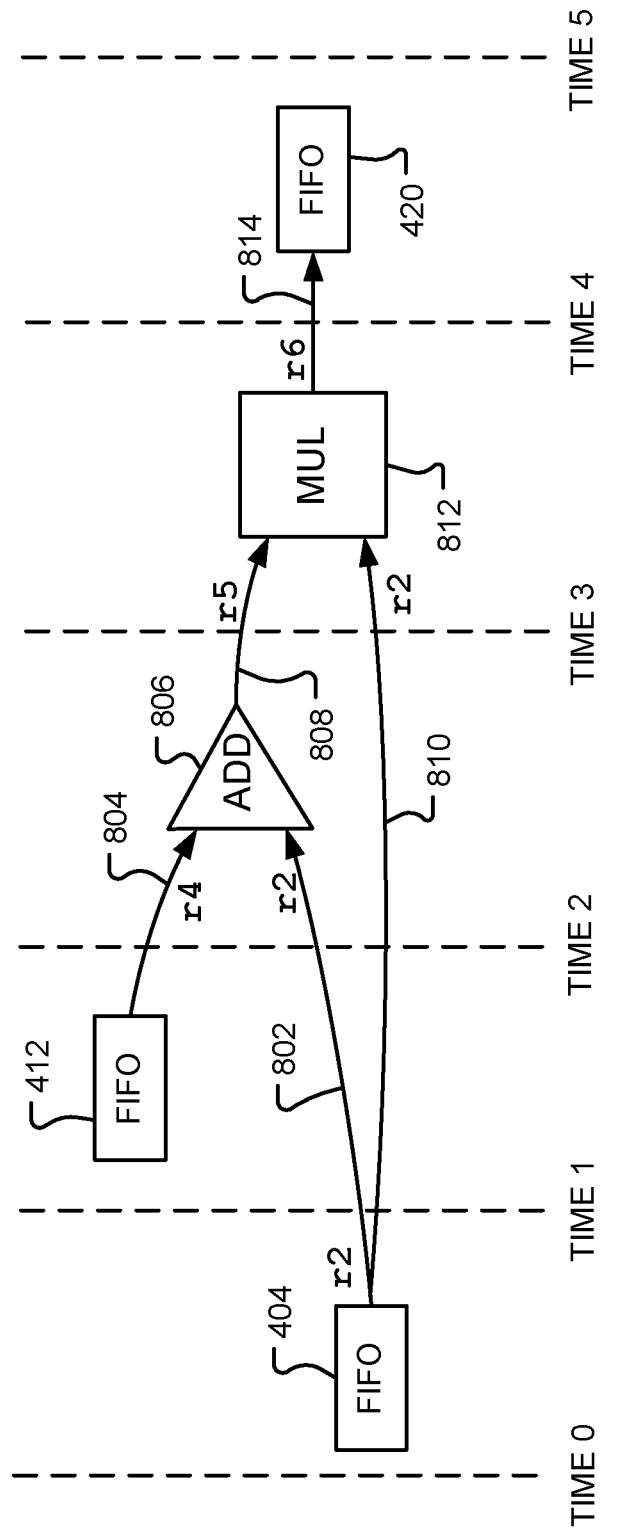
FIG. 8 is a data-flow graph in accordance with various representative embodiments.

FIG. 8 is a data-flow diagram 800 in accordance with representative embodiments. In a data-flow diagram, the nodes represent computational elements, and the edges or connecting lines, represent the data consumed or produced by a computation. FIG. 8 illustrates the information stored in the status vector, described above with reference to FIG. 7. The indicates tines in FIG. 8 correspond to those listed in FIG. 7 and are associated with instruction issuance. At time 0, no data is flowing. At time 1, data 802 is flowing from FIFO 404. The data is contained in register r2. At time 2, data 804 is flowing from FIFO 412 and data 802 is flowing from FIFO 404. Data 804 is contained in register r4. Thus, at time 2, bits are set for registers r2 and r4 in data-flow register 704 in FIG. 7, since neither data-flow has been terminated. These two data-flows are closed or terminated at adder 806, to produce data-flow 808, contained in register r5. Thus, at time 3, only data-flow 808 (in r5) is unterminated. Data-flow 810 from FIFO 404 is still flowing, but the data-flow has at least one termination at adder 806. Data-flows 808 and 810 are processed in multiplier 812 to produce data-flow 814 contained in register r6, which is the only open data-flow at time 4. Data-flow 814 is closed by a PUSH_QR operation into FIFO 420. At time 5, all data-flows are closed and a complete set of vectorizable instruction has been identified. These instructions may be issued as vector micro-operations to a vector processor. In this manner, the status vector illustrated in FIG. 7 may be used to identify vectorizable processes.

Figure 9:
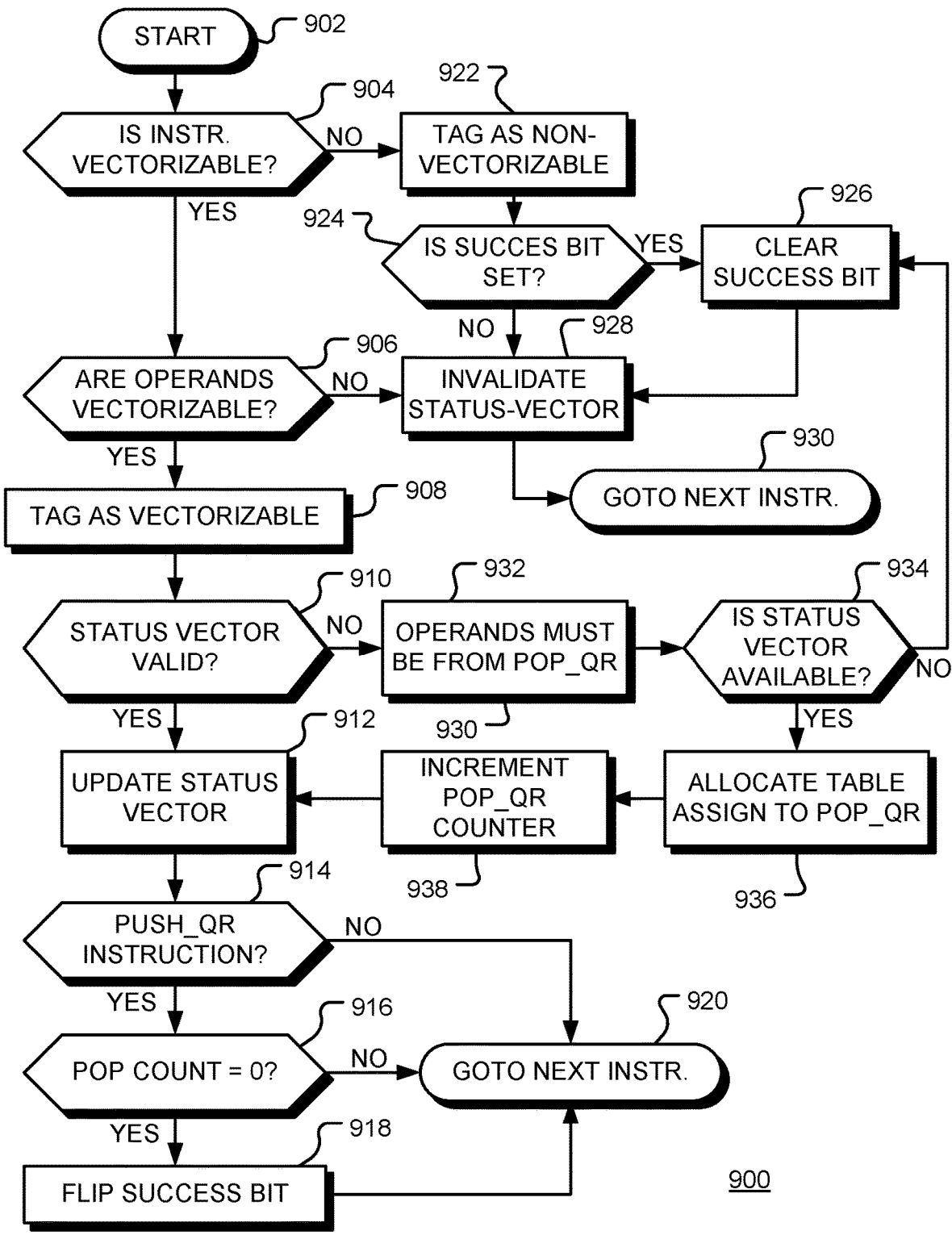
FIG. 9 is a flow chart of a method for vectorizing instructions in a data processing system in accordance with various representative embodiments.

FIG. 9 is a flow chart of a method for vectorizing instructions in a data processing system in accordance with various representative embodiments. The method is performed automatically in the micro-architecture of the system. Following start block 902 in FIG. 9, a check is performed, at decision block 904, on an encountered instruction to determine if it is vectorizable (as indicated by the instruction's predicate, for example). If so, as depicted by the positive branch from decision block 904, a check is made at decision block 906 to determine if the operands of the instruction are also vectorizable. This may be done by checking the data-flow vector as described above. If both the instructions and operands are vectorizable, as depicted by the positive branch from decision block 906, the instruction is tagged as vectorizable at block 908. For example, the bit in column 624 of table 614 in FIG. 6 is set. This table may be included in the reorder buffer. If there is a corresponding status vector, as depicted by the positive branch from decision block 910, the data-flow vector is updated at block 912 to zero-out data-flow sources that are inputs and set bits for data-flow sources that are outputs. Bits associated with memory addresses for PUSH/POP operations are not flipped. If the instruction is a PUSH_QR instructions, as depicted by the positive branch from decision block 914, the POP count is checked at decision block 916. If the instruction is not a PUSH_QR instruction, as depicted by the negative branch from decision block 914, or the POP count is not zero, as depicted by the negative branch from decision block 916, the next instruction is considered at block 920. If the POP count is zero, as depicted by the positive branch from decision block 916, the success bit is flipped at block 918 and the next instruction is considered at block 920.

If the instruction is not vectorizable, as depicted by the negative branch from decision block 904, the instruction is tagged as such, at block 922. For example, the bit in column 624 of table 614 in FIG. 6 may be cleared. Further, if the success bit in the status vector is set, as depicted by the positive branch from decision block 924, the bit is cleared at block 926. The status vector is then invalidated at block 928, and the microarchitecture moves on to the next instruction at block 930. The status vector is also invalidated at block 928 when the operands of a vectorizable are themselves not vectorizable, as depicted by the negative branch from decision block 906.

When a vectorizable instruction with vectorizable operands is found but there is no corresponding valid status vector, as depicted by the negative branch from decision block 910, it is known that the operands come from POP_QR instructions, as indicated by block 932. When a status vector is available, as depicted by the positive branch from decision block 934, a status vector is assigned to the POP_QR operand at block 936. At block 938, the POP_QR counter is incremented and flow continues to block 914.

When non-vectorizable instructions following the setting of a "success" bit are found, the "success" bit will be cleared in the reorder buffer (table 614). On the next pass through the table the POP_QR instruction will marked as zero or fail, and the success will also be cleared for subsequent arithmetic operations that use data from the POP_QR instruction.

In one embodiment, a predictor is used. The predictor may be decremented or de-incentivized for any given instruction (i.e. for a given program counter (PC) value). On each POP_QR the counter that indicates the number of POP_QR instructions (implemented as a shift register) in the status vector is also decremented. When the counter is zero, the data-flow vector and success bits are zeroed and freed for re-use by another auto-vectorizing attempt.

When the POP_QR code is encountered on the second pass through the loop, the indication of success or failure determines whether the micro-architecture will emit vector instructions or simple scalar instructions on this pass. If the first pass indicated failure then the failure will be reflected on the first pass, a bit will be set to prevent vectorization and the computation will continue.

As used herein the term processor, controller or the like may encompass a processor, controller, microcontroller unit (MCU), microprocessor, and other suitable control elements. It will be appreciated that embodiments of the invention described herein provide improved operation compared to conventional processors. The micro-architectural components described above may be used in conjunction with certain non-processor circuits, some, most, or all of the functions described herein. The non-processor circuits may include, but are not limited to storage elements, signal drivers, clock circuits, power source circuits, and user input devices. Some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

Those skilled in the art will recognize that the present invention has been described in terms of exemplary embodiments that provide improvements to the microarchitecture of a programmed processor. The present invention could be implemented using hardware component such as special purpose hardware and/or dedicated processors which are equivalents to the invention as described and claimed. Similarly, the improvements may be implemented in general purpose computers, microprocessor based computers, micro-controllers, optical computers, dedicated processors and/or dedicated hard wired logic.

The improved micro-architecture disclosed above may be described by instructions of a Hardware Description Language. These instructions may be stored on a non-transitory computer readable medium. This enables distribution of the instructions. The instructions may be combined with instructions that describe other components of a data processing system to enable design and manufacture of hardware of the system.

The disclosed architecture may also be described by a netlist representative that, again, may be stored on a non-transitory computer readable medium.

Accordingly, some aspects and features of the disclosed embodiments are set out in the following numbered items:

1. A method for executing an operation, specified by one or more instructions in a data processing system, the method comprising: maintaining data indicators for data registers that indicate when data-flow from a register derives from a restricted source; providing instruction predicates for instructions that indicate which instructions are capable of accelerated execution; determining, from the data indicators and the instruction predicates, when the operation is a thread-restricted function; and executing the operation in a hardware accelerator when the operation is a thread-restricted function, where the method is performed by a microarchitecture of the data processing system.

2. The method of item 1, where the restricted source comprises a data buffer that restricts output to a single execution thread.

3. The method of item 1, where the restricted source comprises a first-in, first-out (FIFO) buffer that restricts output to a single execution thread.

4. The method of item 1, where the restricted source comprises an un-ordered buffer that restricts output to a single execution thread.

5. The method of item 3, where output from the restricted source is indicted by an explicit instruction in an instruction set architecture of the data processing system.

6. The method of item 1, where executing the operation in a hardware accelerator when the operation is a thread-restricted function comprises: generating vector micro-operations; and executing the vector micro-operations.

7. The method of item 6, where the restricted source comprises a first-in, first-out (FIFO) buffer that restricts output to a single execution thread and where generating vector micro-operations comprises: determining an amount of data in the FIFO buffer; and generating a vector micro-operation dependent upon the amount of data in the FIFO buffer.

8. The method of item 1, where determining, from the data indicators and the instruction predicates, when the operation is a thread-restricted function comprises: updating a status vector to indicate opening of data-flows from restricted sources; for each arithmetic instruction of the one or more instructions: updating the status vector to indicate closure of data-flows associated with input operands of the arithmetic instruction; updating the status vector to indicate opening of a data-flow associated with an output operand of the arithmetic instruction; updating the status vector to indicate closing of data-flows to restricted sinks; and determining the operation to be a thread-restricted function when the status vector indicates all data-flows to be closed.

9. The method of item 8, further comprising: determining that the operation is not a thread-restricted function when an instruction predicates for an instruction of the one or more instructions indicates that the instruction is not capable of acceleration; and determining that the operation is not a thread-restricted function when an operand of an instruction of the one or more instructions does not derive from a thread-restricted source.

10. The method of item 9, where the hardware accelerator comprises a vector processor, the method further comprising: executing the operation in a scalar processor when the operation is not a thread-restricted function.

11. The method of item 1, where the hardware accelerator comprises a neuromorphic processor.

12. A data processing system for executing an operation, specified by one or more instructions, the data processing system comprising: a register rename unit indicative of a mapping between architectural registers and physical registers of the data processing system and further indicative of registers associated with a restricted data-flow; a reorder buffer, where an entry in the reorder buffer is associated with an instruction of the one or more instructions and indicates: when operands of the associated instruction are derived from restricted data-flows; and when the instruction is capable of accelerated execution; a status vector store, where a bit in the status vector indicates whether an associated data-flow is open or closed; an acceleration control unit, responsive to the status vector, to control when the operation is performed using accelerated execution and when the operation is performed using non-accelerated execution.

13. The data processing system of item 12, further comprising a micro-operation generator, where the micro-operation generator is controlled by the acceleration control unit to generate vector micro-operations when the operation is performed using accelerated execution micro-operations and scalar micro-operations when the operation is performed using non-accelerated execution.

14. The data processing system of item 13, further comprising a plurality of data buffers, where a restricted data-flow derives from a first data buffer of the plurality of data buffers and a restricted data-flow flows to a second data buffer of the plurality of data buffers.

15. The data processing system of item 13, further comprising a cache, where a data buffer of the plurality of data buffers comprises a virtual first-in, first-out (FIFO) implemented in the cache.

16. The data processing system of item 13, further comprising a scalar processor configured to execute scalar micro-operations and a vector processor configured to execute vector micro-operations.

17. The data processing system of item 12, further comprising a hardware accelerator, where accelerated execution of the operation is performed on the hardware accelerator.

18. The data processing system of item 17, accelerated execution of the operation is performed on the hardware accelerator when the operation produces a bounded data-flow.

19. The data processing system of item 12, further comprising a neuromorphic processor, where the operation produces a bounded data flow having one or more defined inputs and one or more defined outputs and where the one or more defined inputs and one or more defined outputs are used to train the neuromorphic processor.

20. The data processing system of item 19, where, once trained, the neuromorphic processor is configured to generate the one or more outputs from the one or more inputs.

21. A non-transitory computer readable medium containing instructions of a hardware description language that described the data processing system of item 12.

22. A non-transitory computer readable medium containing a netlist representative of the data processing system of item 12.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for executing an operation, specified by one or more instructions in a data processing system, the method comprising:
   maintaining data indicators for data registers that indicate when all input data-flows associated with the operation are restricted, the data is to be consumed by a single execution thread, forming a restricted source;
   providing instruction predicates for instructions that indicate which instructions are capable of accelerated execution;
   determining, from the data indicators and the instruction predicates, when input data to the operation is consumed by the single execution thread, all output data-flows associated with the operation are generated by the single execution thread and all instructions of the operation are capable of accelerated execution, forming a thread-restricted function; and
   executing the operation in a hardware accelerator when the operation is a thread-restricted function,
the method performed by a microarchitecture of the data processing system.

2. The method of claim 1, where the restricted source comprises a data buffer that restricts output to a single execution thread.

3. The method of claim 1, where the restricted source comprises a first-in, first-out (FIFO) buffer that restricts output to a single execution thread.

4. The method of claim 3, where output from the restricted source is indicted by an explicit instruction in an instruction set architecture of the data processing system.

5. The method of claim 1, where the restricted source comprises an un-ordered buffer that restricts output to a single execution thread.

6. The method of claim 1, where executing the operation in a hardware accelerator when the operation is a thread-restricted function comprises:
   generating vector micro-operations; and
   executing the vector micro-operations.

7. The method of claim 6, where the restricted source comprises a first-in, first-out (FIFO) buffer that restricts output to a single execution thread and where generating vector micro-operations comprises:
   determining an amount of data in the FIFO buffer; and
   generating a vector micro-operation dependent upon the amount of data in the FIFO buffer.

8. The method of claim 1, where the hardware accelerator comprises a neuromorphic processor.

9. A method for executing an operation, specified by one or more instructions in a data processing system, the method comprising:
   maintaining data indicators for data registers that indicate when data-flow from a register derives from a restricted source;
   providing instruction predicates for instructions that indicate which instructions are capable of accelerated execution;
   determining, from the data indicators and the instruction predicates, when the operation is a thread-restricted function by:
      updating a status vector to indicate opening of data-flows from restricted sources;
      for each arithmetic instruction of the one or more instructions:

updating the status vector to indicate closure of data-flows associated with input operands of the arithmetic instruction;

updating the status vector to indicate opening of a data-flow associated with an output operand of the arithmetic instruction;

updating the status vector to indicate closing of data-flows to restricted sinks;

determining the operation to be a thread-restricted function when the status vector indicates all data-flows to be closed; and executing the operation in a hardware accelerator when the operation is a thread-restricted function, the method performed by a microarchitecture of the data processing system.

10. The method of claim 9, further comprising:

determining that the operation is not a thread-restricted function when an instruction predicates for an instruction of the one or more instructions indicates that the instruction is not capable of acceleration; and determining that the operation is not a thread-restricted function when an operand of an instruction of the one or more instructions does not derive from a thread-restricted source.

11. The method of claim 10, where the hardware accelerator comprises a vector processor, the method further comprising:

executing the operation in a scalar processor when the operation is not a thread-restricted function.

12. A data processing system for executing an operation, specified by one or more instructions, the data processing system comprising:

a register rename unit indicative of a mapping between architectural registers and physical registers of the data processing system and further indicative of registers associated with a restricted data-flow;

a reorder buffer, where an entry in the reorder buffer is associated with an instruction of the one or more instructions and indicates:

when operands of the associated instruction are derived from restricted data-flows; and when the instruction is capable of accelerated execution;

a status vector store, where a bit in the status vector indicates whether an associated data-flow is open or closed;

an acceleration control unit, responsive to the status vector, to control when the operation is performed using accelerated execution and when the operation is performed using non-accelerated execution.

13. The data processing system of claim 12, further comprising a micro-operation generator, where the micro-operation generator is controlled by the acceleration control unit to generate vector micro-operations when the operation is performed using accelerated execution micro-operations and scalar micro-operations when the operation is performed using non-accelerated execution.

14. The data processing system of claim 13, further comprising a plurality of data buffers, where a restricted data-flow derives from a first data buffer of the plurality of data buffers and a restricted data-flow flows to a second data buffer of the plurality of data buffers.

15. The data processing system of claim 13, further comprising a cache, where a data buffer of the plurality of data buffers comprises a virtual first-in, first-out (FIFO) implemented in the cache.

16. The data processing system of claim 13, further comprising a scalar processor configured to execute scalar micro-operations and a vector processor configured to execute vector micro-operations.

17. The data processing system of claim 12, further comprising a hardware accelerator, where accelerated execution of the operation is performed on the hardware accelerator.

18. The data processing system of claim 17, accelerated execution of the operation is performed on the hardware accelerator when the operation produces a bounded data-flow.

19. The data processing system of claim 12, further comprising a neuromorphic processor, where the operation produces a bounded data flow having one or more defined inputs and one or more defined outputs and where the one or more defined inputs and one or more defined outputs are used to train the neuromorphic processor.

20. The data processing system of claim 19, where, once trained, the neuromorphic processor is configured to generate the one or more outputs from the one or more inputs.

21. A non-transitory computer readable medium containing instructions of a hardware description language that described the data processing system of claim 12.

22. A non-transitory computer readable medium containing a netlist representative of the data processing system of claim 12.

* * * * *